(12) United States Patent
Yamada et al.

(10) Patent No.: US 9,568,730 B2
(45) Date of Patent: Feb. 14, 2017

(54) OPTICAL DEVICE INCLUDING DIFFRACTION ELEMENTS FOR DIFFRACTING LIGHT INSIDE OF A LIGHT GUIDE, IMAGE PROJECTING APPARATUS, AND ELECTRONIC DEVICE

(71) Applicant: Seiko Epson Corporation, Tokyo (JP)

(72) Inventors: Fumika Yamada, Matsumoto (JP); Masatoshi Yonekubo, Hara-mura (JP); Osamu Yokoyama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 28 days.

(21) Appl. No.: 14/659,863

(22) Filed: Mar. 17, 2015

(65) Prior Publication Data
US 2015/0277117 A1    Oct. 1, 2015

(30) Foreign Application Priority Data

Mar. 31, 2014    (JP) ................. 2014-071506

(51) Int. Cl.
G02B 27/01    (2006.01)
F21V 8/00    (2006.01)
G02B 6/34    (2006.01)

(52) U.S. Cl.
CPC ......... G02B 27/0103 (2013.01); G02B 6/0016 (2013.01); G02B 27/0101 (2013.01); G02B 27/0172 (2013.01); G02B 6/34 (2013.01); G02B 2027/0116 (2013.01); G02B 2027/0174 (2013.01); G02B 2027/0178 (2013.01)

(58) Field of Classification Search
CPC ... G02B 6/0016; G02B 5/1842; G02B 5/1828; G02B 27/0103; G02B 27/0101; G02B 27/0172; G02B 6/34; G02B 2027/0116; G02B 2027/0174; G02B 2027/0178; B42D 15/105; B42D 2035/22; G03H 1/30
(Continued)

(56) References Cited

U.S. PATENT DOCUMENTS 7,573,640 B2 * 8/2009 Nivon ................. G02B 5/1814
                                                                345/7
2006/0228073 A1    10/2006 Mukawa et al.
(Continued)

FOREIGN PATENT DOCUMENTS

JP    2002-162598 A    6/2002
JP    2007-094175 A    4/2007
(Continued)

*Primary Examiner* — Bumsuk Won
*Assistant Examiner* — Henry Duong
(74) *Attorney, Agent, or Firm* — ALG Intellectual Property, LLC

(57) ABSTRACT

An optical device includes a light guide plate; a first diffraction element that is a transmission type diffraction element provided on a first face of the light guide plate and that diffracts and ejects at least a portion of light which is guided along inside the light guide plate; a second diffraction element that is a transmission type diffraction element provided on the first face of the light guide plate and that diffracts at least a portion of light proceeding to the light guide plate; and a third diffraction element that is a reflection type diffraction element provided on a face which is an opposite face of the light guide plate from the first face, and that diffracts at least a portion of light which enters an inside of the light guide plate via the second diffraction element.

18 Claims, 6 Drawing Sheets

(58) Field of Classification Search
USPC .......................................................... 359/567
See application file for complete search history.

(56) References Cited

U.S. PATENT DOCUMENTS

2007/0070504 A1    3/2007  Akutsu et al.
2014/0334003 A1*  11/2014  Ventola ................ G02B 5/1814
                                                             359/572

FOREIGN PATENT DOCUMENTS

| JP | 2009-186794 A | 8/2009 |
| JP | 2010-033026 A | 2/2010 |
| WO | WO-2005-093493 A | 10/2005 |

* cited by examiner

OPTICAL DEVICE INCLUDING DIFFRACTION ELEMENTS FOR DIFFRACTING LIGHT INSIDE OF A LIGHT GUIDE, IMAGE PROJECTING APPARATUS, AND ELECTRONIC DEVICE

BACKGROUND

1. Technical Field

The present invention relates to an optical device, an image projecting apparatus, and an electronic device.

2. Related Art

Recently, there have been commercialized image projecting apparatuses which guide image light emitted by an image display apparatus to the eyes of an observer by using an optical device including a light guide plate, and thereby enable the observer to observe an image (virtual image). For example, for a head-mounted display, a kind of such image projecting apparatus, developments targeted for downsizing, broadening viewing angle, and improving efficiency have been promoted. For such an optical device, heretofore, there has been proposed a method of employing an optical diffraction element as a component for causing light to enter a light guide plate and/or a component for causing light guided along inside the light guide plate to be emitted.

Meanwhile, with respect to a diffraction property of such an optical diffraction element, there is a large wavelength dependency. For this reason, in an image projecting apparatus incorporating an optical device employing such an optical diffraction element, color unevenness of an observed virtual image sometimes increases.

Thus, there has been proposed an optical device including a plurality of optical diffraction elements each associated with a corresponding one of a plurality of color light components (for example, red, green, and blue light components). In an image projecting apparatus employing such an optical device, through a method of causing each of a plurality of color light components which constitute light guided by a light guide plate to be diffracted by a corresponding one of the optical diffraction elements, it is possible to display a virtual image resulting from a reduction of a difference which exists in diffraction efficiency between any two of the color light components and which is caused by the wavelength dependency of the diffraction efficiency (for example, JP-A-2009-186794).

In a configuration disclosed in JP-A-2009-186794, for each of two kinds of components, one for causing light to enter the inside of a wave guide plate, the other one for causing light to be emitted from the inside of the light guide plate, a plurality of optical diffraction elements each associated with a corresponding one of a plurality of color light components which constitute light guided along inside the wave guide plate are layer-stacked. Thus, as the structure of the optical device disclosed in JP-A-2009-186794 has become complex, the manufacturing cost of the image projecting apparatus is likely to increase.

Further, in the case where a plurality of optical diffraction elements each associated with a corresponding one of mutually different color light components are provided in the form of stacked layers, there arises a phenomenon in which light having been diffracted by an optical diffraction element associated with a certain color light component enters an optical diffraction element associated with a different color light component, and consequently the light is subjected to further diffraction. Thus, it becomes difficult to control diffraction angles, and as a result, there have been cases where this difficulty of control has caused a problem, such as degradation of image quality of a displayed virtual image.

SUMMARY

An advantage of some aspects of the invention is provision of an optical device which is used in an image projecting apparatus and which is capable of displaying a high-quality image by utilizing a simple configuration. Another advantage of some aspects of the invention is provision of an image projecting apparatus which includes such an optical device and which is capable of displaying a high-quality image. A further advantage of some aspects of the invention is provision of an electronic device which includes such an image projecting apparatus and which is capable of displaying a high-quality image.

An optical device according to a first aspect of the invention includes a light guide; a first diffraction element that is a transmission type diffraction element provided on a first face of the light guide and that diffracts and emits at least a portion of light which is guided along inside the light guide; a second diffraction element that is a transmission type diffraction element provided on the first face of the light guide and that diffracts at least a portion of light which enters the light guide; and a third diffraction element that is a reflection type diffraction element provided on a face which is an opposite face of the light guide from the first face, and that diffracts at least a portion of light which enters an inside of the light guide via the second diffraction element.

According to this configuration, zero-order light, which is not diffracted by the second diffraction element, can be diffracted by the third diffraction element, and thus, it is possible to increase the amount of light emitted by the first diffraction element. Thus, it becomes possible to display a bright and high-quality image (vertical image) by utilizing a simple configuration.

In the first aspect of the invention, the configuration may be made such that an angle formed between light diffracted by the second diffraction element and the first face is the same as an angle formed between light diffracted by the third diffraction element and the second face.

According to this configuration, it becomes possible to easily and highly efficiently emit light from the light guide.

In the first aspect of the invention, the configuration may be made such that the third diffraction element includes a diffraction grating of a surface relief type and a reflection film covering a surface of the diffraction grating.

According to this configuration, it becomes possible to make the whole of the optical device thin.

In the first aspect of the invention, the configuration may be made such that the third diffraction element includes a transmission type diffraction grating, and a first reflection member which is provided at an opposite side of the diffraction grating from the second face.

According to this configuration, it becomes possible to display a bright and high-quality image (vertical image) by utilizing a simple configuration.

In the first aspect of the invention, the configuration may be made such that the second diffraction element includes a second reflection member which is provided on an opposite face of the second diffraction element from the first face so as to cover a portion of the light guide.

According to this configuration, zero-order light, which is not diffracted by the third diffraction element, can be diffracted by the second diffraction element. Thus, it becomes possible to increase the amount of light emitted by the first diffraction element, and display a bright and high-quality image (vertical image) by utilizing a simple configuration.

In the first aspect of the invention, the configuration may be made such that at least one of the first diffraction element, the second diffraction element and the third diffraction element is a volume hologram.

According to this configuration, in general, the volume hologram has diffraction efficiency higher than that of the surface relief type diffraction element, and thus, it becomes possible to increase the amount of light emitted by the first diffraction element, and display a bright and high-quality image (vertical image) by utilizing a simple configuration.

In the first aspect of the invention, the configuration may be made such that the first diffraction element includes a first portion at which light that falls within a first wavelength band is diffracted so as to form a first angle relative to the first face, and a second portion at which light that falls within a second wavelength band is diffracted so as to form the first angle relative to the first face.

According to this configuration, it is possible to emit light resulting from light division for each wavelength band from the first diffraction element.

In the first aspect of the invention, the configuration may be made such that the second diffraction element includes a third portion at which light that falls within the first wavelength band is diffracted so as to form a second angle relative to the first face, and a fourth portion at which light that falls within the second wavelength band is diffracted so as to form the second angle relative to the first face.

According to this configuration, it is possible to emit light resulting from light division at the second diffraction element from the first diffraction element.

In the first aspect of the invention, the configuration may be made such that light which falls within the first wavelength band and which results from diffraction at the third portion is configured so as to enter the first portion, and light which falls within the second wavelength band and which results from diffraction at the fourth portion is configured so as to enter the second portion.

According to this configuration, it is possible to highly efficiently emit light resulting from light division at the second diffraction element from the first diffraction element.

In the first aspect of the invention, the configuration may be made such that the third diffraction element includes a fifth portion at which light that falls within the first wavelength band is diffracted so as to form the second angle relative to the second face, and a sixth portion at which light that falls within the second wavelength band is diffracted so as to form the second angle relative to the second face.

According to this configuration, it is possible to emit light resulting from light division at the third diffraction element from the first diffraction element.

In the first aspect of the invention, the configuration may be made such that light which falls within the first wavelength band and which results from diffraction at the fifth portion is configured so as to enter the first portion, and light which falls within the second wavelength band and which results from diffraction at the sixth portion is configured to enter the second portion.

Further, an image projecting apparatus according to a second aspect of the invention includes an image display apparatus that emits image light, and the aforementioned optical device, and the aforementioned optical device causes the image light to enter the light guide, and causes the image light which is propagated inside the light guide to be diffracted and emitted by the first diffraction element.

According to this configuration, the image projecting apparatus includes the aforementioned optical device, and thus, enables display of a high-quality image.

An electronic device according to a third aspect of the invention includes the aforementioned image projecting apparatus.

According to this configuration, the electronic device includes the aforementioned image projecting apparatus, and thus enables display of a high-quality image.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment will be described with reference to some of the drawings. In addition, in all drawings below, in order to make it easy to understand the drawings, dimensions, magnification/reduction ratios, or the like regarding individual constituent components are made mutually different when needed.

Figure 1:
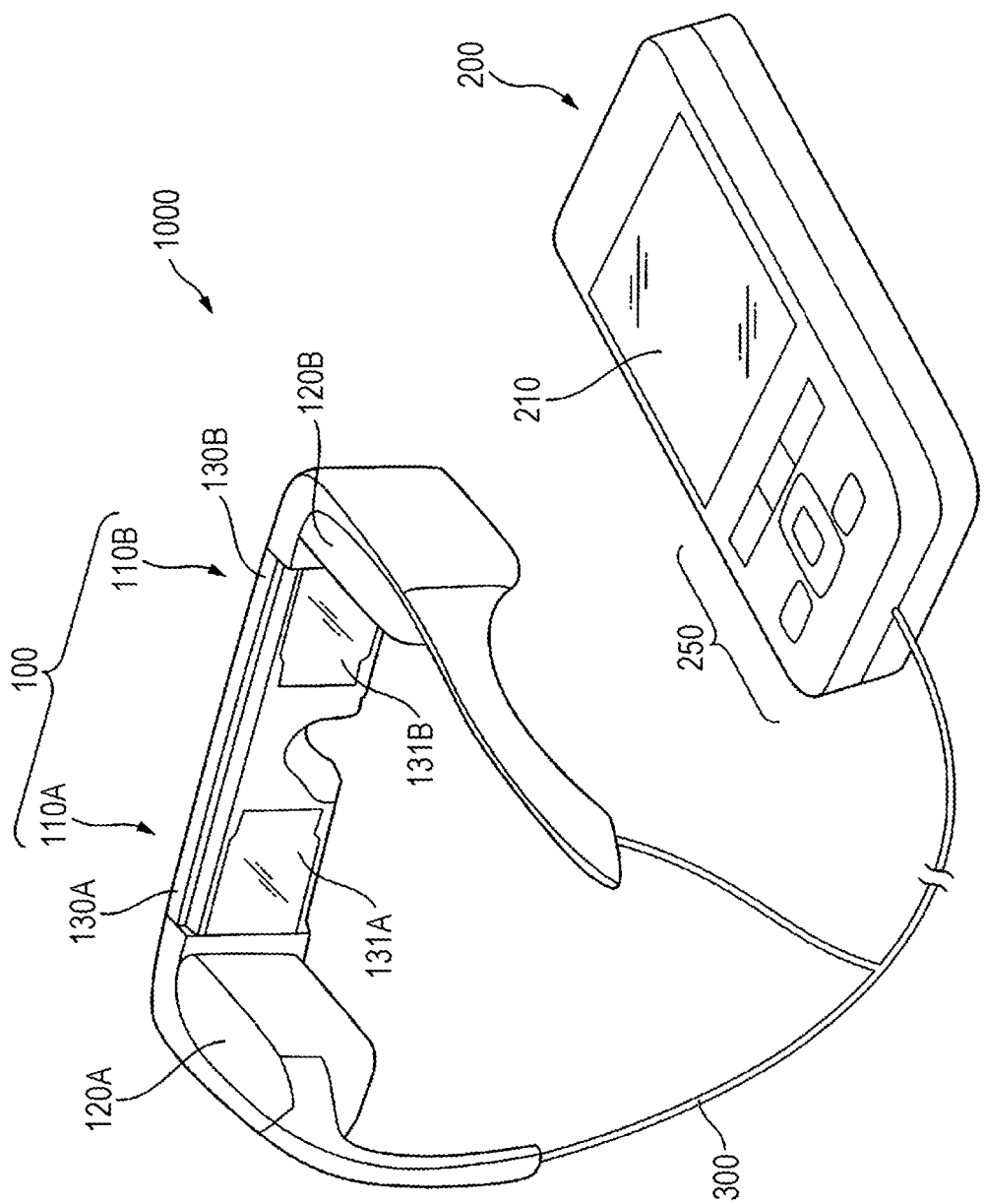
FIG. 1 is an external view of an electronic device according to an embodiment of the invention.

FIG. 1 is a diagram illustrating an external view of an electronic device according to this embodiment. In this embodiment, as an electronic device, a transmission type head-mount display (a display apparatus 1000) is provided. This display apparatus 1000 includes the optical device according to the first aspect of the invention and the image projecting apparatus according to the second aspect of the invention.

The display apparatus 1000 according to this embodiment is provided with a body 100 having a shape just like that of a pair of eyeglasses and a controller 200 having a size such that it enables a user to grasp it with their hand.

The body 100 and the controller 200 are connected to each other so as to be mutually communicable in a wired or wireless manner. In this embodiment, the body 100 and the controller 200 are connected to each other via a cable 300 so as to be mutually communicable. Further, the body 100 and the controller 200 transmit and receive image signals and control signals to/from each other via this cable.

The body 100 includes a left-eye display portion 110A and a right-eye display portion 110B.

The left-eye display portion 110A includes an image formation portion 120A for forming image light for a left-eye image as well as a light guide unit 130A for guiding the image light for the left-eye image.

The image formation portion 120A is contained in an eyeglass-temple portion of the body 100 of an eyeglasses type, and the light guide unit 130A is contained in an eyeglass-lens portion of the body 100 of an eyeglasses type.

The light guide unit 130A includes a viewing portion 131A having optical transparency. The light guide unit 130A emits the image light for the left-eye image, which propagates inside the light guide unit 130A, toward a left eye of a user from the viewing portion 131A. In addition, in the display apparatus 1000, the viewing portion 131A has optical transparency, which enables a user to view surrounding objects.

The right-eye display portion 110B includes an image formation portion 120B for forming image light for a right-eye image as well as a light guide unit 130B for guiding the image light for the right-eye image. The left-eye display portion 110A and the right-eye display portion 110B employ the same configuration, and they are configured so as to be bilaterally symmetrical relative to a central portion (around a nose pad) of the body 100 of an eyeglasses type.

The controller 200 includes an operation portion 210 and an operating button portion 250. A user sends instructions to the body 100 by performing input operations on the operation portion 200 and the operating button portion 250.

Figure 2:
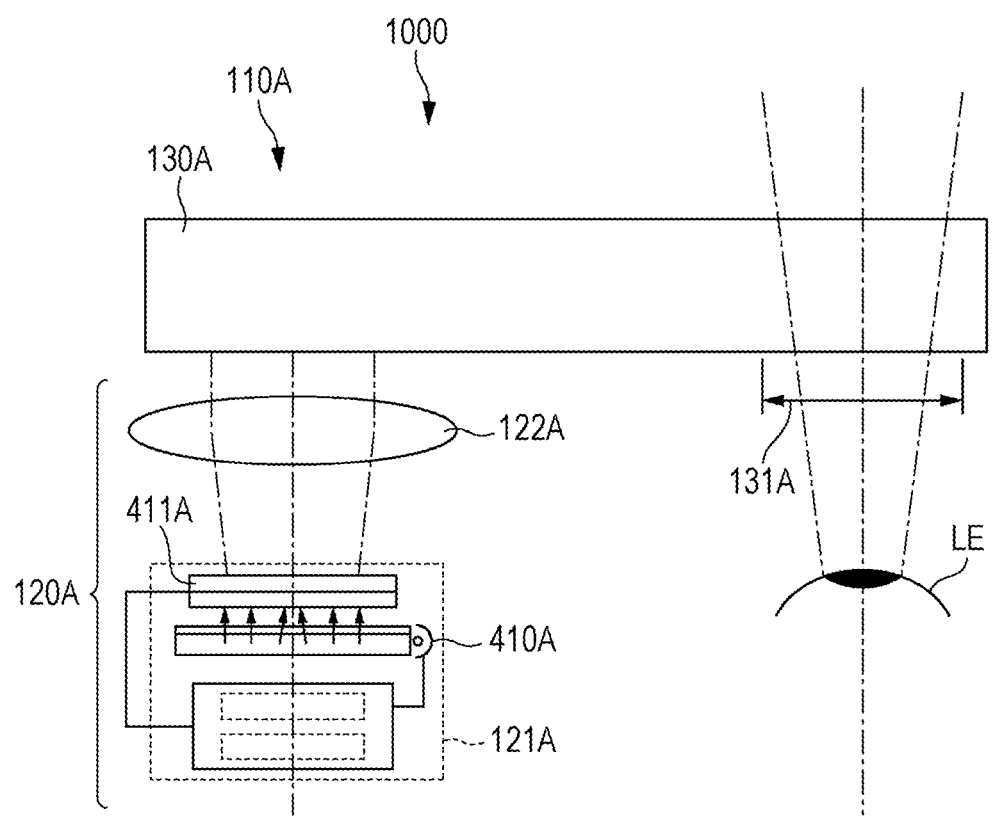
FIG. 2 is a plan view of an example of a configuration of a left-eye display portion of a display apparatus.

FIG. 2 is a plan view illustrating an example of a configuration of the left-eye display portion 110A included in the display apparatus 1000 according to this embodiment of the invention. In FIG. 2, there is illustrated a left eye LE of a user who wears the body 100. Here, only an example of a configuration of the left-eye display portion 110A will be described.

The image formation portion 120A and the light guide unit 130A which are illustrated in FIG. 2 correspond to the image projecting apparatus according to the second aspect of the invention. The light guide unit 130A corresponds to the optical device according to the first aspect of the invention.

The image formation portion 120A includes an image display portion 121A for a left eye and a projection optical system 122A for the left eye. The image display portion 121A includes a back light 410A for the left eye and an optical modulation element 411A for the left eye. This image display portion 121A corresponds to the image display apparatus according to the second aspect of the invention.

The back light 410A is constituted by a set of light sources each for a corresponding one of light colors, such as red, green, and blue, to be emitted. Each of the light sources can be realized by using, for example, a light emitting diode (LED) or a laser light source. The optical modulation element 411A can be realized by using, for example, a liquid crystal display device which is a display element.

In addition, the image display portion 121A can also be realized by employing a commonly known image display apparatus, such as an organic electroluminescence apparatus (organic EL apparatus) or a scan type image display apparatus including a laser light source and a scan type optical system including a MEMS mirror and having a function of scanning laser light.

The projection optical system 122A is constituted by, for example, a group of projection lenses for projecting incident image light and projects image light emitted by the optical modulation element 411A of the image display portion 121A such that projected image light forms light fluxes in a mutually parallel state.

A relative position of the light guide unit 130A is fixed relative to the projection optical system 122A, and the image light emitted by the projection optical system 122A is guided to a predetermined position.

Subsequently, the outline of the display apparatus 1000 according to this embodiment will be described with reference to FIGS. 1 and 2.

First, an image signal from the controller 200 is input to the image display portion 121A. Further, in the image display portion 121A having received the image signal, the light sources of the back light 410A each emit a corresponding one of red light, green light, and blue light. The red light, the green light and the blue light each having been emitted by a corresponding one of the light sources are projected toward the optical modulation element 411A.

The optical modulation element 411A space-modulates the projected red light, green light, and blue light in accordance with the image signal having been input to the image display portion 121A. Through this operation, the image display portion 121A forms image light corresponding to the relevant image signal, and emits this formed image light toward the projection optical system 122A.

The projection optical system 122A forms incident image light into light fluxes in a mutually parallel state, simultaneously with magnification of the incident image light, and then emits resultant image light toward the light guide unit 130A.

The light guide unit 130A propagates the image light, while allowing the reflections thereof, inside the light guide unit 130A itself, and emits the image light toward the left eye LE of a user from the viewing portion 131A. The emitted image light forms a virtual image on the retina of the left eye LE.

Further, at least a portion of the light entering the viewing portion 131A from surrounding areas is transmitted through the viewing portion 131A itself and is guided to the left eye LE of a user. This method enables the user to view an image resulting from superposition of an image having been formed by the image formation portion 120A and an optical image from surrounding objects.

Consequently, a user perceives an image (virtual image) corresponding to image light output from the body 100 by wearing the body 100 of the display apparatus 1000 on his or her head. Moreover, the user is able to view surrounding objects via the viewing portions 131A and 131B of the body 100 in the state of wearing the body 100 on his or her head.

Figure 3:
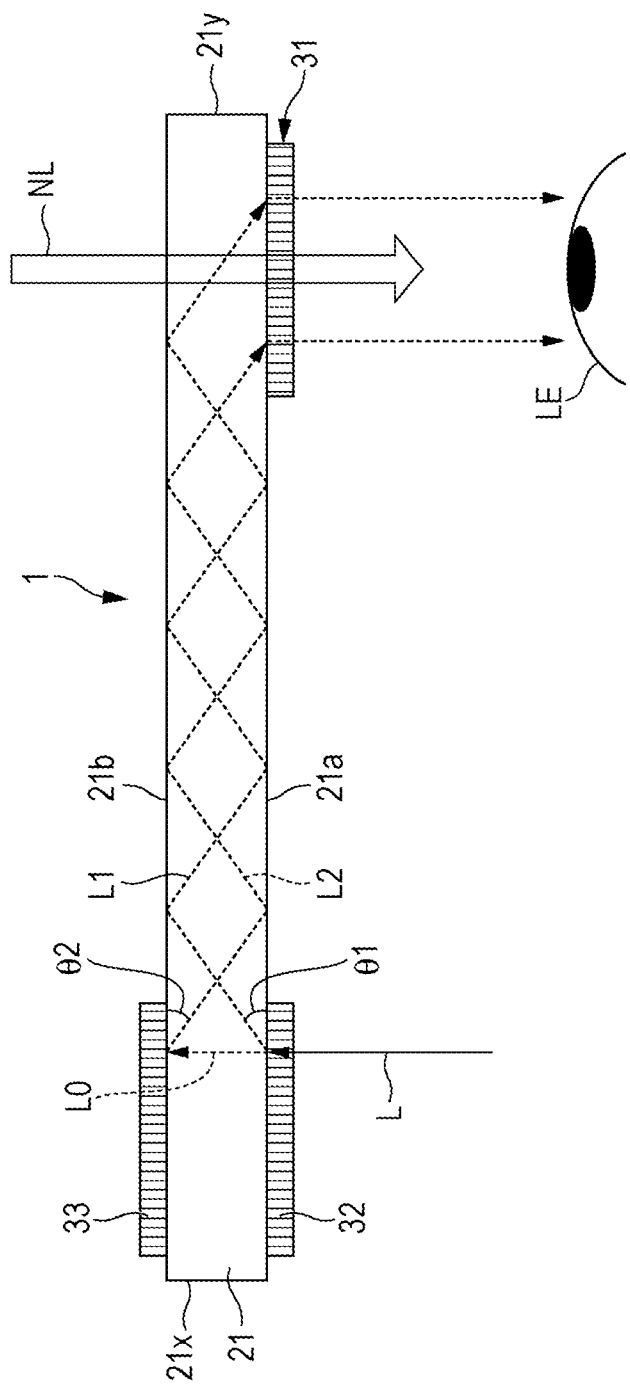
FIG. 3 is a diagram that describes an optical device according to a first embodiment of the invention.

FIG. 3 is a diagram that describes, in detail, the optical device 1 included in the light guide unit 130A shown in FIG. 2 while focusing attention on only the optical device 1. The optical device 1 of this embodiment includes a light guide plate 21 (the light guide according to the first aspect of the invention), a first diffraction portion 32 (the first diffraction element according thereto), a second diffraction portion 32 (the second diffraction element according thereto), and a third diffraction portion 33 (the third diffraction element according thereto).

This light guide plate 21 is a long member having optical transparency and includes a first face 21a and a second face 21b which extend in the same direction on opposite sides of the light guide plate 21. The light guide plate 21 guides light having entered a side of one end 21x to a side of the other one end 21y in the direction in which the light guide plate 21 extends. The light guide plate 21 of this embodiment is a rectangular-shaped member including the first face 21a and the second face 21b, which are parallel to each other.

In the light guide plate 21, light having entered the inside thereof is guided while being reflected at the first face 21a and the second face 21b. The reflection at each of the first face 21a and the second face 21b may be total reflection or may be caused by a reflection member provided at an area which is included in each of the first face 21a and the second face 21b and which is desired to have a reflection property.

For example, a metallic film, a dielectric multilayer film, or a diffraction element can be used as the reflection member.

The light guide plate 21 can be realized by using any inorganic material or organic material, provided that a material to be used has optical transparency. In the case where, for light guided inside the light guide plate 21, the total reflection at each of the first face 21a and the second face 21b is utilized, it is preferable to employ, as a material for the light guide plate 21, a material having a refractive index as high as possible so that a difference in a refractive index between the employed material and a medium surrounding the light guide plate 21 (the medium being, for example, air) increases.

The light guide plate 21 of this embodiment is configured such that an area at the other one end side of the second face 21b has optical transparency, and external light NL enters via this area of the second face 21b. Further, this configuration enables the external light NL to reach the left eye LE of an observer via the light guide plate 21, and enables the observer to observe surrounding objects. The area having optical transparency in the second face 21b is determined appropriately in accordance with a viewing angle.

The first diffraction portion 31 is provided at the other one end 21y side of the first face 21a. The first diffraction portion 31 is a transmission type diffraction element.

The second diffraction portion 32 is provided at the one end 21x side of the first face 21a. The second diffraction portion 32 is a transmission type diffraction element. The optical device 1 of this embodiment is configured such that a surface relief type diffraction element having the same diffraction property as that of the first diffraction portion 31 is used as the second diffraction portion 32. The use of a diffraction element like the second diffraction portion 32 makes it possible to make the whole of the optical device thin.

The third diffraction portion 33 is provided at the one end 21x side of the second face 21b so as to be opposite the second diffraction portion 32. The third diffraction portion 33 is a reflection type diffraction element.

In the optical device 1 of this embodiment, the third diffraction portion 33 is realized by using a reflection type diffraction element which has a reflection property, and which is obtained by evaporating a metallic film (reflection film) on a surface relief type diffraction element having the same diffraction property as that of the first diffraction portion 31. The use of the third diffraction portion 33 configured in such a way makes it possible to make the whole of the optical device thin.

The second diffraction portion 32 and the third diffraction portion 33 have the same diffraction property, and thus, an angle θ1 formed between light resulting from diffraction by the second diffraction portion 32 (the angle θ1 being, for example, a diffraction angle of positive first-order light) and the first face 21a becomes the same angle as an angle θ2 formed between light resulting from diffraction by the third diffraction portion 33 and the second face 21b (the angle θ2 being, for example, a diffraction angle of positive first-order light).

In the optical device 1 configured in such a way, incident light L which enters the inside of the light guide plate 21 via the second diffraction portion 32 is diffracted and emitted at an angle of the angle θ1 formed relative to the first face 21a at the second diffraction portion 32, and emitted light is guided to the other one end 21y side of the light guide plate 21. In FIG. 3, the emitted light, that is, diffracted light which is emitted at an angle of the angle θ1 from the second diffraction portion 32, is denoted by a reference sign L1.

In this case, partial light LO, which is a portion of the incident light L, is zero-order light which is not diffracted by the second diffraction portion 32, and is transmitted through the second diffraction portion 32 in a normal direction of the first face 21a. This partial light LO enters the third diffraction portion 33, which is provided so as to be opposite the second diffraction portion 32, in a normal direction of the second face 21b. The partial light LO is diffracted and emitted at an angle of the angle θ2 formed relative to the second face 21b at the third diffraction portion 33, and emitted light is guided to the other one end 21y side of the light guide plate 21. In FIG. 3, the emitted light, that is, diffracted light which is emitted at an angle of the angle θ2 from the third diffraction portion 33, is denoted by a reference sign L2.

The diffracted light L1 having been emitted at an angle of the angle θ1 from the second diffraction portion 32 and the diffracted light L2 having been emitted at an angle of the angle θ2 from the third diffraction portion 33 enter the first diffraction portion 31, which is provided at the other one end 21y side of the light guide plate 21, at the same incident angle (i.e., θ1=θ2).

In the first diffraction portion 31, the diffracted light L1 and the diffracted light L2 are each diffracted at a predetermined angle and emitted to the outside. Further, the incident angle of the diffracted light L1 and that of the diffracted light L2 are equal to each other, and thus, it becomes possible to emit light from the light guide plate 21 easily and highly efficiently.

An observer perceives an image (virtual image) on the basis of light (image light) having been emitted by the optical device 1 and having entered the left eye LE. In addition, the first diffraction portion 31 of the optical device 1 is placed at a position corresponding to the viewing portion 131A of the light guide unit 130A shown in FIG. 2.

The optical device 1 configured in such a way as described above is capable of causing the zero-order light, which has not been diffracted by the second diffraction portion 32, to be diffracted by the third diffraction portion 33, and thus, it is possible to increase the amount of light emitted by the first diffraction portion 31. Thus, it becomes possible to display a bright and high-quality image (virtual image) in a simple configuration.

Further, the image projecting apparatus (i.e., the left-eye display portion 110A and the right-eye display portion 110B) according to this embodiment includes the optical device 1 configured in such a way as described above, and thus, enables display of a high-quality image (virtual image).

The display apparatus 1000 according to this embodiment includes the aforementioned left-eye display portion 110A and right-eye display portion 110B, and thus, enables display of a high-quality image (virtual image).

In addition, the first diffraction portion 31 of this embodiment may be configured so as to include a first portion having a diffraction property suitable for light falling within a first wavelength band (for example, red light) and a second portion having a diffraction property suitable for light falling within a second wavelength band (for example, blue light). For example, the first portion causes red light having entered the first diffraction portion 31 to be diffracted in a normal direction of the first face 21a, that is, in a direction 90 degrees to the first face 21a (this 90 degrees corresponds to the first angle in the first aspect of the invention). Further, the second portion causes blue light having entered the first diffraction portion 31 to be diffracted in a normal direction of the first face 21a, that is, in a direction 90 degrees to the first face 21a (this 90 degrees corresponds to the first angle in the first aspect of the invention).

Here, in this description, "a diffraction property suitable for (light)" means that a diffraction pattern is designed such that, in response to a wavelength of incident light, a direction in which diffracted light is emitted forms a diffraction angle exactly equal to a desired design value. The diffracted light is, for example, positive first-order light.

In a diffraction element, a diffraction angle varies depending on a wavelength of incident light. Thus, in the case where light rays having respective mutually different wavelengths enter at the same incident angle, in order to diffract the light rays in the same direction, it is necessary to design a diffraction pattern suitable for each of the wavelengths of the incident light rays. In the case of a surface relief type diffraction element, a diffraction angle can be controlled by controlling the pitch and depth of the concavity/convexity structure of the surface reflect type diffraction element.

Such a configuration makes it possible to emit light resulting from light division for each wavelength band from the first diffraction portion 31.

In this case, moreover, the second diffraction portion 32 may be configured to include a third portion having a diffraction property suitable for light falling within the first wavelength band (for example, red light) and a fourth portion having a diffraction property suitable for light falling within the second wavelength band (for example, blue light). For example, the third portion causes red light having entered the second diffraction portion 32 to be diffracted such that an angle formed between diffracted light and the first face 21a becomes equal to the second angle. Further, the fourth portion causes blue light having entered the second diffraction portion 32 to be diffracted such that an angle formed between diffracted light and the first face 21a becomes equal to the second angle.

In this case, preferably, a configuration is made such that the light falling within the first wavelength band and having been diffracted at the third portion of the second diffraction portion 32 enters the first portion of the first diffraction portion 31, and the light falling within the second wavelength band and having been diffracted at the fourth portion of the second diffraction portion 32 enters the second portion of the first diffraction portion 31.

This configuration makes it possible to appropriately emit light resulting from light division at the second diffraction portion 32 from the first diffraction portion 31.

Moreover, in this case, the third diffraction portion 33 may be configured to include a fifth portion having a diffraction property suitable for light falling within the first wavelength band (for example, red light) and a sixth portion having a diffraction property suitable for light falling within the second wavelength band (for example, blue light). For example, the fifth portion causes red light having entered the third diffraction portion 33 to be diffracted such that an angle formed between diffracted light and the second face 21b becomes equal to the second angle. Further, the sixth portion causes blue light having entered the third diffraction portion 33 to be diffracted such that an angle formed between diffracted light and the second face 21b becomes equal to the second angle.

In this case, preferably, a configuration is made such that the light falling within the first wavelength band and having been diffracted at the fifth portion of the third diffraction portion 33 enters the first portion of the first diffraction portion 31, and the light falling within the second wavelength band and having been diffracted at the sixth portion of the third diffraction portion 33 enters the second portion of the first diffraction portion 31.

This configuration makes it possible to appropriately emit light resulting from light division at the third diffraction portion 33 from the first diffraction portion 31.

Further, although, in this embodiment, the light guide plate 21 is formed as a rectangular-shaped member having the first face 21a and the second face 21b, which are parallel to each other, the configuration of the light guide plate 21 is not limited to this configuration. For example, even when a portion of the first face 21a is inclined relative to the second face 21b, a light guide plate having such a configuration can be used, provided that, as the result of providing an inclined portion on the first face 21a or the second face 21b so that the inclined portion compensates for a difference between reflection angles due to the inclined portion of the first face 21a, an angle incident to the first diffraction portion 31 becomes equal to a desired angle. Even when each of the first face 21a and the second face 21b includes a curved face, similarly, a light guide plate having such a configuration can be used, provided that, as the result of employing a different method, an angle incident to the first diffraction portion 31 becomes equal to a desired angle.

Second Embodiment

Figure 4:
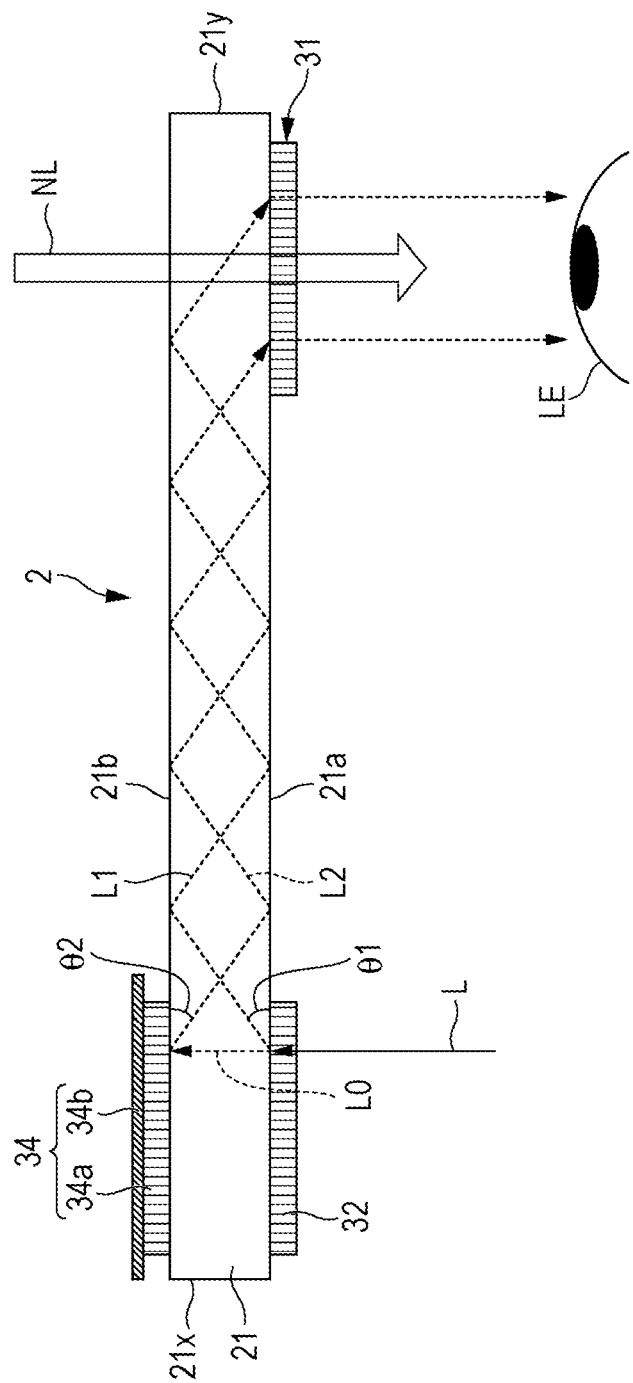
FIG. 4 is a diagram that describes an optical device according to a second embodiment of the invention.

FIG. 4 is a diagram that describes an optical device 2 according to a second embodiment of the invention. The configuration of the optical device 2 of this embodiment is partially common to that of the optical device 1 of the first embodiment, and is different therefrom in the configuration of the third diffraction portion 33. Thus, in this embodiment, components common to those of the first embodiment will be each denoted by the same reference sign as that of a corresponding one of the common components of the first embodiment, and detailed description thereof will be omitted.

An optical device 3 includes a light guide plate 21, a first diffraction portion 31, a second diffraction portion 32 and a third diffraction portion (third diffraction element) 34.

The third diffraction portion 34 includes a transmission type diffraction element 34a and a first reflection plate (first reflection member) 34b which is provided on the diffraction element 34a so as to overlap the diffraction element 34a, and constitutes a reflection type diffraction element as a whole.

The diffraction element 34a is a surface relief type diffraction element.

The first reflection plate 34b is provided such that its reflection face is opposite the second face 21b and is parallel to the second face 21b. The first reflection plate 34b can be realized by using, for example, a metallic plate, a plate-shaped member provided on its surface with a metallic film or a dielectric multilayer film.

The third diffraction portion 34 is designed such that an angle $\theta 2$ of diffraction light (for example, positive first-order light) emitted by the third diffraction portion 34 becomes equal to an angle $\theta 1$ of diffraction light (for example, positive first-order light) emitted by the second diffraction portion 32.

In addition, for the third diffraction portion 34, as a result, light which is a portion of incident light LO is subjected to diffraction twice, that is, once on a light path from incidence to the third diffraction portion 34 up to arrival at the first reflection plate 34b, and once on a light path from reflection at the first reflection plate 34b up to arrival at the second face 21b. Thus, the diffraction element 34 is preferable to be designed such that such a light element is also emitted at angle of the angle $\theta 2$. Nevertheless, in the case where, even when a design is performed under a condition in which such a light element is omitted, there is no problem in practical use, a transmission type diffraction element having the same configuration as that of the second diffraction portion 32 may be employed as the diffraction element 34a. In this case, since parts therefor can be made common, a cost reduction can be achieved and the angles θ1 and θ2 can be easily made equal to each other.

For the optical device 2 having such a configuration as described above, such a process of evaporating a metallic film with respect to the third diffraction portion 33 as having been described in the first embodiment becomes unnecessary for the third diffraction portion 34, so that a simple configuration can be achieved. Further, in the case where a transmission type diffraction element is used as a reflection type diffraction element by evaporating a metallic film on the transmission type diffraction element, there is a possibility that the value of a diffraction angle becomes different from a desired design value due to an in-plane distribution of a film thickness of the metallic film, but there is no such a possibility for the third diffraction portion 34 having the above-described configuration. Moreover, since such an evaporation process becomes unnecessary, a cost increase can be suppressed.

Accordingly, in the optical device 2, it becomes possible to display a bright and high-quality image (virtual image) in a simple configuration.

Third Embodiment

Figure 5:
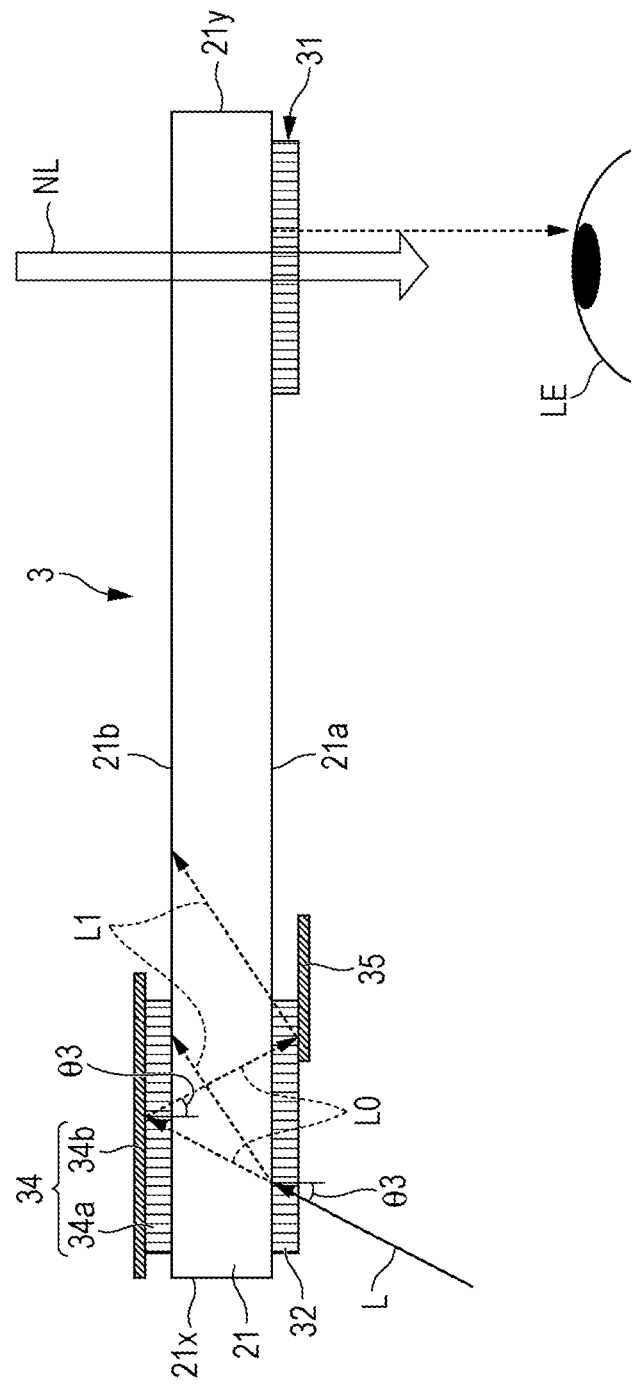
FIG. 5 is a diagram that describes an optical device according to a third embodiment of the invention.

FIG. 5 is a diagram that describes an optical device 3 according to a third embodiment of the invention. The configuration of this optical device 3 of this embodiment is partially common to that of the optical device 2 having been described in the second embodiment, and is different therefrom in the respect that a second reflection plate (second reflection member) is provided on an opposite face of the second diffraction portion 32 from the first face 21a. Thus, in this embodiment, components common to those of the first and second embodiments will be each denoted by the same reference sign as that of a corresponding one of the common components of the first and second embodiments, and detailed description thereof will be omitted.

The second reflection plate 35 is provided on an opposite face of the second diffraction portion 32 from the first face 21a so as to cover a portion of the other one end side of the second diffraction portion 32. The second reflection plate 35 is provided such that its reflection face is opposite the first face 21a and is parallel with the first face 21a. For the second reflection plate 35, the same configuration as that of the aforementioned first reflection plate 34b can be employed.

For example, incident light L which enters the first face 21a at an incident angle θ3 relative to the first face 21a is diffracted and emitted by the second diffraction portion 32; while light LO, which is a portion of the incident light L, enters the third diffraction portion 34 as zero-order light which is not diffracted by the second diffraction portion. Moreover, light which is a portion of the zero-order light LO entering the third diffraction portion 34 is further emitted by the third diffraction portion 34 as zero-order light which is not diffracted by the third diffraction portion 34.

For the optical device 3, the reflection plate 35 is provided on an opposite face of the second diffraction portion 32 from the first face 21a, and thus, the zero-order light having not been diffracted by the third diffraction portion 34 can be diffracted by the second diffraction portion 32. Thus, the amount of light emitted by the first diffraction portion 31 is increased, so that it becomes possible to display a bright and high-quality image (virtual image) by utilizing a simple configuration.

Hereinbefore, preferred embodiments according to some aspects of the invention have been described with reference to the drawings, but it is to be noted that, obviously, the invention is not limited these embodiments. The shapes, combinations, and the like regarding the individual constituent members having been described in the aforementioned embodiments are just examples and can be variously changed on the basis of design requirements or the like within the scope not departing from the gist of the invention.

In each of the aforementioned embodiments, the configuration has been made such that a surface relief type diffraction element is used as each of the first diffraction portion 31, the second diffraction portion 32, the third diffraction portion 33, and the diffraction element 34a, but the invention is not limited to this configuration. One or more of these may be realized by using a volume hologram. In general, such a volume hologram has a diffraction efficiency higher than that of the surface relief type diffraction element, and thus, makes it possible to increase the amount of light emitted by the first diffraction portion 31, so that it becomes possible to display a bright and high-quality image (virtual image) in a simple configuration.

In the case where the diffraction portions are each realized by using the volume hologram, design for making diffraction angles thereat equal to one another is needed. For example, in the case where, in the optical device 1 of the first embodiment, a volume hologram is used as each of the second diffraction portion 32 and the third diffraction portion 33, design is performed as described below.

Figure 6:
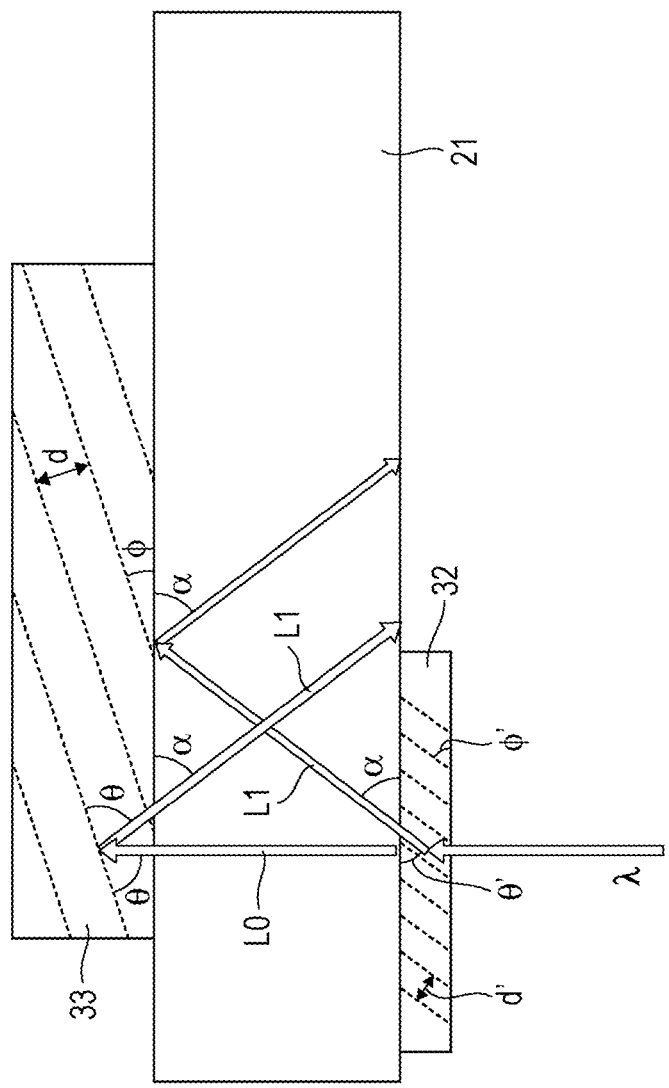
FIG. 6 is a diagram that describes a design concept of an optical device according to a modification example of the invention.

FIG. 6 is a diagram that, in the case where a volume hologram is used as each of the second diffraction portion 32 and the third diffraction portion 33, describes a design concept regarding the volume hologram.

The third diffraction portion 33, which is a volume hologram, is designed such that, when zero-order light (i.e., transmitted light) from the second diffraction portion 32 enters the third diffraction portion 33, an angle of reflected and diffracted light which arises inside the third diffraction portion 33 corresponds to an angle of diffracted light from the second diffraction portion 32 inside the light guide plate 21. That is, the design is performed such that an angle of diffracted light from the third diffraction portion 33 corresponds to an angle of diffracted light from the second diffraction portion 32 under Bragg's condition which is determined on the basis of a refractive index of the third diffraction portion 33, a pitch of stripes of a volume hologram, and a gradient angle of the stripes of the volume hologram.

Assuming that a refractive index of each of the second diffraction portion 32 and the third diffraction portion 33 corresponds to a refractive index of the light guide plate 21, and incident light enters from a normal direction of the first face 21a, the design is performed as follows.

When a wavelength of incident light is denoted by $\lambda$; a pitch of stripes of the third diffraction portion 33 which is a volume holograph is denoted by d; a Bragg reflection angle of the third diffraction portion 33 is denoted by θ; and a gradient angle of interference stripes of the third diffraction portion 33 is denoted by $\phi$, a propagation angle $\alpha$ inside the light guide plate 21 regarding light emitted by the third diffraction portion 33 is represented by the following formula.

$$\alpha = \sin^{-1}(\lambda/2d) - \phi$$

Further, when a pitch of stripes of the second diffraction portion 32 which is a volume holograph is denoted by d'; a Bragg reflection angle of the second diffraction portion 32 is denoted by θ'; and a gradient angle of interference stripes of the second diffraction portion 32 is denoted by ϕ', a propagation angle α inside the light guide plate 21 regarding light emitted by the second diffraction portion 32 is represented by the following formula.

$$\alpha = \phi' - \sin^{-1}(\lambda/2d')$$

Consequently, in order to cause a propagation angle inside the light guide plate 21 regarding diffracted light emitted by the second diffraction portion 32 to correspond to a propagation angle inside the light guide plate 21 regarding diffracted light emitted by the third diffraction portion 33, it is sufficient merely to record the interference stripes of each of the second diffraction portion 32 and the third diffraction portion 33 so as to satisfy a condition represented by the following formula.

$$\sin^{-1}(\lambda/2d) - \phi = \phi' - \sin^{-1}(\lambda/2d')$$

The entire disclosure of Japanese Patent Application No. 2014-071506, filed Mar. 31, 2014 is expressly incorporated by reference herein.

What is claimed is:

1. An optical device comprising:
a light guide including an inside portion disposed between a first face and a second face, the second face being disposed at an opposite side of the inside portion to the first face;
a first diffraction element that is a transmission type diffraction element provided on a first face of the light guide and that diffracts and emits at least a portion of light which is guided along the inside portion of the light guide;
a second diffraction element that is a transmission type diffraction element provided on the first face of the light guide and that diffracts at least the first portion of light which enters the inside portion of the light guide; and
a third diffraction element that is a reflection type diffraction element provided on the second face of the light guide, and that diffracts at least a second portion of the light which enters the inside portion of the light guide via the second diffraction element,
wherein
both the first portion of light and the second portion of light travel along the inside portion of the light guide by alternately reflecting between the first face and the second face, and
an angle formed between the first face and the first portion of light traveling from the first face toward the second face is the same as an angle formed between the second face and the second portion of light traveling from the second face toward the first face.

2. The optical device according to claim 1, wherein the third diffraction element includes a diffraction grating of a surface relief type and a reflection film covering a surface of the diffraction grating.

3. An image projecting apparatus comprising:
an image display apparatus that emits image light; and
the optical device according to claim 2,
wherein the optical device causes the image light to enter the light guide, and causes the image light which is propagated inside the light guide to be diffracted and emitted by the first diffraction element.

4. An electronic device comprising the image projecting apparatus according to claim 3.

5. The optical device according to claim 1, wherein the third diffraction element includes a diffraction grating of a transmission type and a first reflection member which is provided at an opposite side of the diffraction grating from the second face.

6. An image projecting apparatus comprising:
an image display apparatus that emits image light; and
the optical device according to claim 5,
wherein the optical device causes the image light to enter the light guide, and causes the image light which is propagated inside the light guide to be diffracted and emitted by the first diffraction element.

7. An electronic device comprising the image projecting apparatus according to claim 6.

8. The optical device according to claim 1, wherein the second diffraction element includes a second reflection member which is provided on an opposite face of the second diffraction element from the first face so as to cover a portion of the light guide.

9. An image projecting apparatus comprising:
an image display apparatus that emits image light; and
the optical device according to claim 8,
wherein the optical device causes the image light to enter the light guide, and causes the image light which is propagated inside the light guide to be diffracted and emitted by the first diffraction element.

10. The optical device according to claim 1, wherein at least one of the first diffraction element, the second diffraction element, and the third diffraction element is a volume hologram.

11. The optical device according to claim 1, wherein the first diffraction element includes a first portion at which light that falls within a first wavelength band is diffracted so as to form a first angle relative to the first face, and a second portion at which light that falls within a second wavelength band is diffracted so as to form the first angle relative to the first face.

12. The optical device according to claim 11, wherein the second diffraction element includes a third portion at which light that falls within the first wavelength band is diffracted so as to form a second angle relative to the first face, and a fourth portion at which light that falls within the second wavelength band is diffracted so as to form the second angle relative to the first face.

13. The optical device according to claim 12, wherein light which falls within the first wavelength band and which results from diffraction at the third portion is configured so as to enter the first portion, and light which falls within the second wavelength band and which results from diffraction at the fourth portion is configured so as to enter the second portion.

14. The optical device according to claim 11, wherein the third diffraction element includes a fifth portion at which light that falls within the first wavelength band is diffracted so as to form the second angle relative to the second face, and a sixth portion at which light that falls within the second wavelength band is diffracted so as to form the second angle relative to the second face.

15. The optical device according to claim 14, wherein light which falls within the first wavelength band and which results from diffraction at the fifth portion is configured so as to enter the first portion, and light which falls within the second wavelength band and which results from diffraction at the sixth portion is configured to enter the second portion.

16. An image projecting apparatus comprising:
an image display apparatus that emits image light; and
the optical device according to claim 1,
wherein the optical device causes the image light to enter the light guide, and causes the image light which is propagated inside the light guide to be diffracted and emitted by the first diffraction element.

17. An electronic device comprising the image projecting apparatus according to claim 16.

18. The optical device according to claim 1, wherein
the second diffraction element diffracts the first portion of light toward the inside portion of the light guide at a first diffraction angle formed between the first portion of light and the second diffraction element,
the third diffraction element diffracts the second portion of light toward the inside portion of the light guide at a second diffraction angle formed between the second portion of light and the third diffraction element, and
the second diffraction angle is the same as the first diffraction angle.

\* \* \* \* \*